Nov. 30, 1937.   J. H. KINTZELE   2,100,443
BOTTLE EMPTYING AND BEVERAGE RECLAIMING DEVICE
Filed March 27, 1935
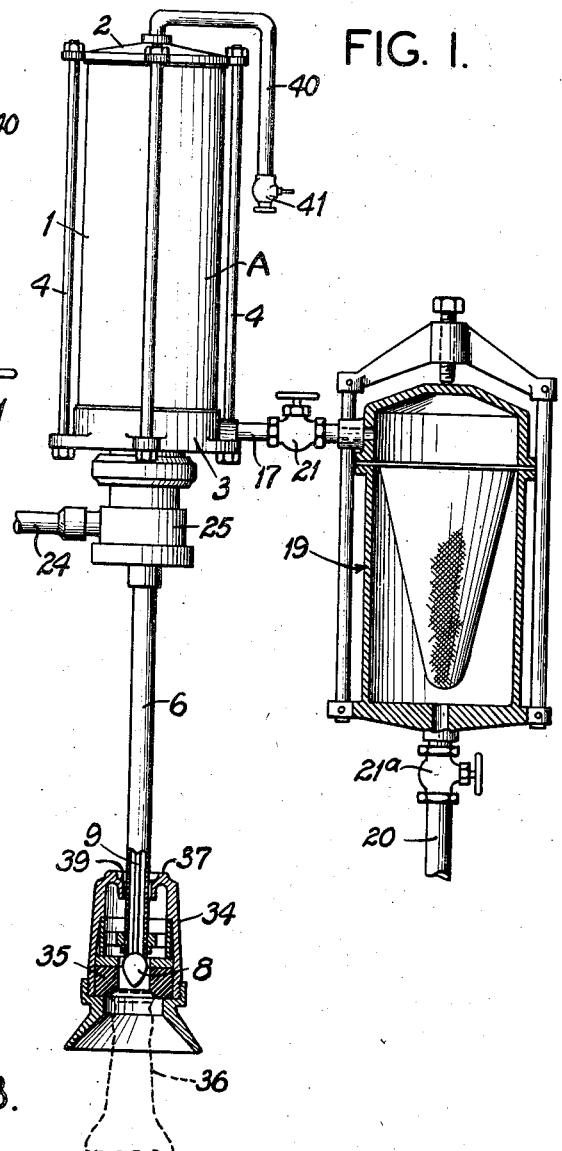
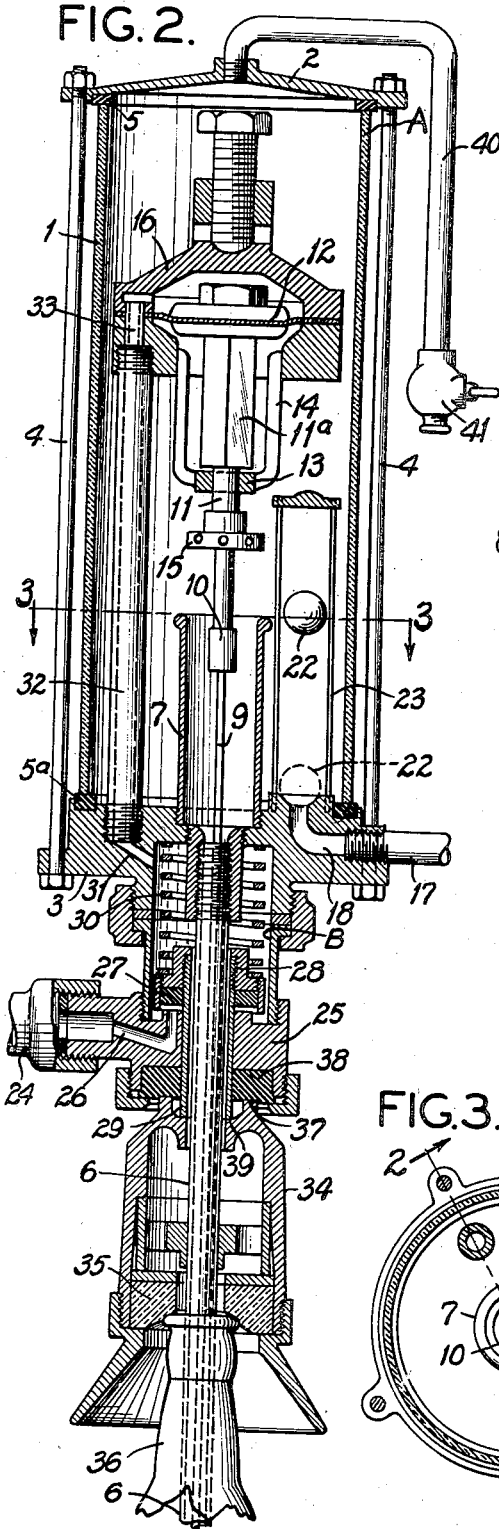
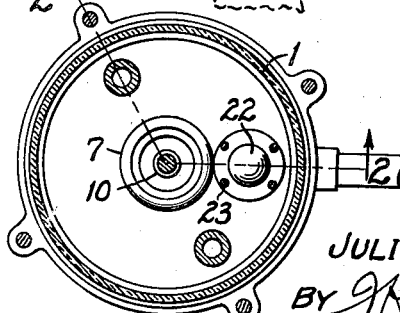
INVENTOR;
JULIUS H. KINTZELE
BY *J Henry Kinealy*
ATTORNEY Patented Nov. 30, 1937

2,100,443

UNITED STATES PATENT OFFICE 2,100,443

BOTTLE EMPTYING AND BEVERAGE RECLAIMING DEVICE

Julius H. Kintzele, St. Louis, Mo.

Application March 27, 1935, Serial No. 13,233

7 Claims. (Cl. 221—74)

My invention relates to bottle emptying and beverage reclaiming devices and more particularly to such devices which may be used in connection with the bottling of beer or other gaseous fluids so that defective bottles or bottles which have been improperly filled may be emptied and the fluid so reclaimed may be returned to the filling line or to the source of supply without becoming flat or being deteriorated in any other way.

Heretofore, in bottling beer or other gaseous fluids, if a bottle was improperly filled or if the bottle was defective, the bottled fluid usually was thrown away with a resultant loss. Since this procedure was followed periodically the aggregate loss from the waste was great. In order to prevent deterioration of beer, it is necessary to maintain it under constant pressure in the source of supply, in the filling lines and in the bottling machine. Therefore, if beer which has been drawn from the filling line is to be reclaimed, it must be returned to the source of supply or filling line under pressure. Similarly, if beer is poured at atmospheric pressure from a bottle which has been filled or partially filled it loses much of its gaseous content and, therefore, is deteriorated.

To avoid the waste of destroying the beer in improperly filled bottles and in defective bottles, an attempt has been made to reclaim the beer by pouring it into a tank from where the beer was forced under pressure back into the filling line. Of course, as stated above, the beer became flat and otherwise deteriorated during the pouring into the tank and often the beer so deteriorated affected the taste and quality of the beer in the line or in the source of supply to such an extent that the quality of many bottles of beer subsequently filled was impaired seriously.

To obviate these and other problems, the objects of my invention are to provide a bottle emptying and beverage reclaiming device which empties bottles with the beverage under pressure so that no deterioration thereof will result; and to provide such a device whereby the beverage emptied from the bottle may be returned under similar pressure to the source of supply or filling line in its original state and without impairment of quality.

One embodiment of my invention is fully shown in the accompanying drawing wherein similar characters are used to designate similar parts: In the drawing, Fig. 1 is a view, in elevation, of my device; Fig. 2 is an axial view, partly in section; and Fig. 3 is a cross section along the lines 3—3 in Fig. 2.

Referring to the figures, I have shown therein one embodiment of my invention as particularly adapted for use in connection with the bottling of beer.

In this embodiment, a tank A to receive the beer when it is emptied from the bottle, as hereinafter described, is formed by a cylinder 1, preferably of glass, and an upper head 2 and a lower head 3 held in firm position on opposite ends of the cylinder 1 by any expedient, such as tie bolts 4. To assure a tight fit between the parts, I prefer that gaskets 5 and 5ª between the heads and the edges of the cylinder be positioned, as shown in Fig. 2. Extending downwardly from the tank A is a tube 6, which tube has its upper end terminating inside of the tank in an enlarged sleeve 7. The lower end of the tube is arranged to form a seat for a pear valve member 8 carried at the lower end of a rod 9 extending downwardly inside of the tube and having its upper end secured to a boss 10, in turn, fixed to a composite shaft 11. The shaft 11 may be in one piece or it may be formed of several parts, as shown in Fig. 2.

At its upper end the shaft 11 is carried, preferably substantially centrally, by a flexible diaphragm 12. It will be seen that when the diaphragm is moved downwardly, as shown in Fig. 2, the shaft 9 will be moved downwardly to carry the valve member 8 away from the end of the tube and when the diaphragm is moved upwardly the rod 9 will be moved to bring the member 8 onto its seat at the end of the tube 6 and thereby close the tube. In order that downward movement of the shaft 11 may be stopped, I prefer that a collar 13 carried by arms 14 may be provided to engage the enlarged portion 11ª of the shaft. An adjusting element 15 may be provided so that the length of the shaft 11 may be changed by movement of the element 15 whereby the seating of the valve member 8 can be regulated.

A chamber for the diaphragm 12 is formed by the casing 16. This chamber encloses the upper side of the diaphragm 12, but the lower side of the diaphragm is open to the pressure in the tank, all for the purposes more fully hereinafter explained.

Leading from the bottom of the tank so that beer therein may be drawn therefrom is a flow pipe 17 threaded or otherwise fixed in the port 18. The pipe 17, in this embodiment leads into a filter generally designated at 19. This filter may be of the type shown in Fig. 1 or of any other suitable construction. A duct 20 leads from the filter to the filling line, source of supply or other place to which the reclaimed beer is to be returned. Manually operable valves 21 and 21a may be provided to control the flow into and from the filter.

The inner end of the port 18 is formed and arranged to provide a seat for a floating valve member 22, which, as hereinafter described, follows the level of the fluid in the tank. The float 22, when the tank is empty, will seat and close the port 18 and is confined to a path vertically above the port by a cage 23, all as shown in Fig. 2.

Carried by the lower head 3 of the tank is a valve assembly, which operates upon predetermined conditions, described below, to admit compressed air from an air line 24 into the interior of a bottle being emptied and above the level of the fluid therein and also to admit compressed air into the chamber above the diaphragm 12. This valve assembly consists of a block 25 adapted to receive the compressed air line 24 and drilled or otherwise formed with a port 26 opening, in this embodiment, on the upper face of the block. The portion of the block contiguous with the upper end of the port 26 is adapted to bear, when the valve is closed, upon a seat 27 of rubber or any suitable material.

The seat 27 is carried and moves with a ring 28 fixed to a downwardly extending and slidably mounted sleeve 29, which projects through the block 25. Normally, the ring 28 is forced downwardly by a coiled spring 30 to maintain the seat 27 on the block 25 and thereby to prevent air from flowing outwardly through the port 26. However, it will be seen that when the sleeve 29 is moved upwardly, as by pressure against its lower end, the ring 28 and seat 27 will also be moved upwardly to uncover the port 26 and allow compressed air flowing therethrough to enter the chamber B provided in the valve assembly. From this chamber B compressed air may flow into the chamber above the diaphragm 12 through port 31 in the lower head 3, tubes 32, and port 33 in the casing 16. Also, the compressed air from the chamber B may flow downwardly in a space provided between the sleeve 29 and tube 6, all as shown clearly in Fig. 2.

Slidably mounted on the tube 6 is a bell 34 having a cushion 35 adapted to engage the mouth of a bottle 36 from which beer is to be reclaimed. When the tube 6 and bottle 36 are moved relative to each other so that the tube is positioned in the bottle with its lower end adjacent the bottom thereof, the bell 34 will be moved upwardly on the tube until the shoulder 37 on the bell engages the cushion 38 carried at the lower side of the block 25. At the same time the shoulder 39 on the bell will engage the sleeve 29 to move it upwardly and open the port 26, as described. The bell 34 is hollow so that compressed air flowing downwardly between the sleeve 29 and tube 6 may find its way through the bell into the interior of the bottle above the level of fluid therein.

In the use of my invention the tank and its carried parts may be lowered onto the bottle or the bottle may be raised by any suitable expedient. However, in any event, as will be seen from a description of its operation immediately to follow, the tank and bottle must be moved relatively towards each other.

Having described the various parts of the device embodying my invention, the following description of its operation will be understood:

Before the operation of the device is started an empty bottle is placed in position and the tube 6 is moved thereinto. When the bottle has been raised sufficiently the port 26 will be opened to allow compressed air to enter the chamber B. This compressed air flowing therefrom into the chamber above the diaphragm 12 will move said diaphragm downwardly with a resultant opening of the valve 8 at the lower end of the tube 6. Compressed air from the chamber B also will be forced through the mouth of the bottle into the bottle and will then flow through the tube 6 into the tank A. When the bottle is moved downwardly pressure on the upper side of the diaphragm 12 will be released to some extent when the port 26 is closed and the pressure in the tank A working against the lower side of the diaphragm 12 will move the diaphragm to close the valve 8.

After this preliminary adjustment, the device is ready for practical operation.

When an improperly filled or defective bottle is to be emptied of its contents the bottle is moved upwardly along the tube 6 and the bell 34 carried by the mouth of the bottle will move the air valve assembly to open the port 26. The valve 8 will be moved to open the lower end of the tube 6 and the compressed air entering the bottle above the level of fluid therein will force the fluid upwardly through the tube 6 into the tank A. The fluid entering the tank will compress the air already therein and such counter-acting pressure will force the fluid outwardly through the port 18 and duct 17. The port 18 will be open as the level of fluid rises in the tank and the float 22 is carried off of its seat. The action of the device and the level of fluid in the tank may be regulated by the pressure maintained in the tank A and, in turn, this pressure may be regulated by exhausting air from the tank through the duct 40 by means of a manually controlled valve 41.

When fluid in the bottle 36 has been emptied therefrom to a level coinciding with the lower end of the tube 6 the bottle is lowered manually along the tube 6 and as the bell 34 drops downwardly the spring 30 will impel the ring 28 and seat 27 downwardly to close the port 26 and further flow of compressed air into the device will be stopped. Usually a level of fluid in the tank A coinciding substantially with the upper end of the sleeve 7 should be maintained, but if through accident, mistake or error operation of the device is continued after the lower end of the tube 6 has been uncovered in the bottle the compressed air entering the tank A through the bottle and tube 6 will force the fluid from the tank. However, no air will be allowed to enter the port 18 and duct 17 and, in turn, to enter the filling line because as the level of fluid in the tank drops the float 22 will move downwardly and will close the port 18 before said port is uncovered.

From the above description it will be seen that the fluid is emptied from the bottle under pressure and is then returned to the source of supply or filling line under similar pressure and, therefore, no deterioration of the fluid during such emptying and reclaiming operation will result.

While, as stated above, I have shown one embodiment only of my device, it is to be understood that in adapting my invention to a number of uses to which it is susceptible, changes in the shape, size and arrangement of the various parts may be made within wide limits without deviating from the spirit of the appended claims.

What I claim as new and desire to secure by Letters Patent, is:—

1. A device for the purpose described comprising a closed tank to receive and maintain under pressure fluid from a bottle being emptied, a tube adapted to be positioned in said bottle during the emptying operation so that the lower end of said tube is adjacent the bottom of said bottle, said tube having its upper end opening into the lower part of said tank, a valve opening when said tube is in position in said bottle to admit air under pressure into said bottle above the level of fluid therein, a duct leading from said tank to a source of supply for said fluid, and a valve for said duct operated by the level of fluid in said tank.

2. A device for the purpose described comprising a closed tank to receive and maintain under pressure fluid from a bottle being emptied, a tube adapted to be positioned in said bottle during the emptying operation so that the lower end of said tube is adjacent the bottom of said bottle, said tube having its upper end opening into the lower part of said tank, a valve opening automatically when said tube is moved into position in said bottle to admit compressed air into said bottle above the level of fluid therein, a valve positioned normally to close the lower end of said tube but arranged to open automatically with the admission of said air, a duct leading from said tank to a source of supply for said fluid, and a valve for said duct operated by the level of fluid in said tank whereby said valve will be moved to open said duct when the level of fluid is above the open end of said duct in said tank but will be moved to close said duct before said level drops below said open end.

3. A device for the purpose described comprising a normally closed tank to receive and maintain under pressure fluid from a bottle being emptied, a tube adapted to be positioned in said bottle during the emptying operation and having its upper end opening into said tank above the bottom thereof but at a point substantially below the top thereof whereby air in said tank will be trapped in the upper part thereof by fluid entering said tank, means for passing air under pressure into said bottle above the level of fluid therein whereby the fluid in said bottle will be forced upwardly through said tube into said tank, and a duct leading from the bottom of said tank to carry therefrom fluid emptied from a bottle.

4. A device for the purpose described comprising a normally closed tank to receive and maintain under pressure fluid from a bottle being emptied, a tube adapted to be positioned in said bottle during the emptying operation and having its upper end projecting into said tank whereby the discharge opening of said tube is positioned above the bottom of said tank but at a point substantially below the top thereof whereby air in said tank will be trapped in the upper part thereof by fluid entering said tank, means for passing air under pressure into said bottle above the level of fluid therein whereby the fluid in said bottle will be forced upwardly through said tube and be emptied into said tank above the bottom thereof, and a duct leading from said tank at a point below the discharge opening of said tube and arranged to carry from said tank fluid emptied from a bottle.

5. A device for the purpose described comprising a normally closed tank to receive and maintain under pressure fluid from a bottle being emptied, a tube adapted to be positioned in said bottle during the emptying operation so that the lower end of said tube is adjacent the bottom of said bottle, said tube having its upper end opening into said tank above the bottom thereof, a valve opening automatically when said tube is in place in said bottle to admit air under pressure into said bottle above the level of fluid therein whereby the fluid in said bottle will be forced upwardly through said tube into said tank and a duct leading from the bottom of said tank to carry therefrom the fluid emptied from a bottle.

6. A device for the purpose described comprising a normally closed tank to receive and maintain under pressure fluid from a bottle being emptied, a tube adapted to be positioned in said bottle during said emptying operation and having its upper end opening into said tank above the bottom thereof, means for passing air under pressure into said bottle above the level of fluid therein whereby fluid in said bottle will be forced upwardly through said tube into said tank, a duct leading from the bottom of said tank to carry therefrom fluid emptied from a bottle, and said tank being formed and arranged whereby air will be trapped above the level of fluid therein and as said level rises said air will be compressed to exert pressure on the exposed surface of said fluid.

7. A device for the purpose described comprising a normally closed tank to receive and maintain under pressure fluid from a bottle being emptied, a tube adapted to be positioned in said bottle during said emptying operation and having its upper end opening into said tank above the bottom thereof, means for passing air under pressure into said bottle above the level of fluid therein whereby fluid in said bottle will be forced upwardly through said tube into said tank, a duct leading from the bottom of said tank to carry therefrom fluid emptied from a bottle, said tank being formed and arranged whereby air will be trapped above the level of fluid therein and as said level rises said air will be compressed to exert pressure on the exposed surface of said fluid, and manually operable means for venting said trapped air to the atmosphere whereby the level of fluid in said tank may be regulated.

JULIUS H. KINTZELE.